United States Patent Office 3,298,211
Patented Jan. 17, 1967

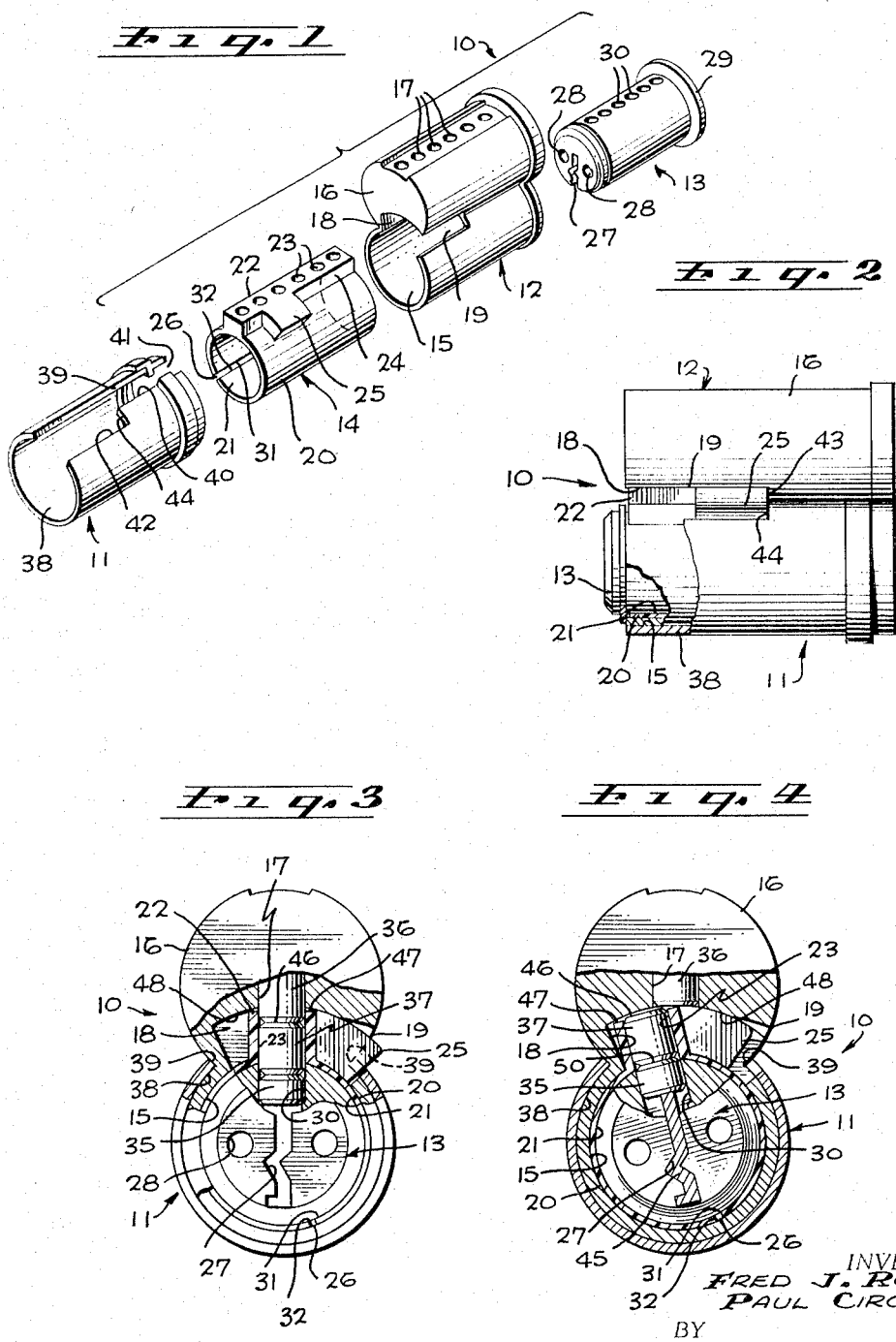

3,298,211
SLEEVE FOR KEY-ACTUATED MECHANISM
Fred J. Russell, 8635 Otis St., South Gate, Calif. 90280, and Paul Cirocco, Bellflower, Calif; said Cirocco assignor to said Russell
Filed Dec. 21, 1964, Ser. No. 419,761
3 Claims. (Cl. 70—369)

Although the invention has general reference to locks, the device here under consideration is more properly described as a unitary key-actuated mechanism of a type used with a great variety of locks, the mechanism being one known to the trade as a pin tumbler mechanism.

Unitary pin tumbler key-actuated mechanisms have been known and used for many decades. It has been the common practice to make such key-operated mechanisms removable from a given lock and replaceable with another key-actuated mechanism keyed for a different key, so as to be able in this manner to substitute use of one key for another. The key-operated mechanism forming the environment for the present invention is one which makes use of two keys of different kinds, one key being the normal operator key for manipulating the lock and the other being a special key employed for the sole purpose of removing one key-actuated mechanism for replacement with another.

Heretofore, such key-actuated mechanisms have been constructed entirely of metal, which metal employed has usually been brass. Consequently all moving parts have had a metal to metal contact. In order to keep such parts working smoothly, some form of lubrication had to be employed. Sometimes the lubrication is a light oil or grease; on other occasions the lubrication may be a dry lubricant such as graphite. In all instances, however, care must be taken that the lubrication is provided when the key-actuated mechanism is installed and that the lubrication is renewed whenever the moving parts become sticky and hard to manipulate.

Although there has been considerable interest in substituting low friction material for certain moving parts in mechanisms of different kinds, employment of such low friction materials in the somewhat intricate mechanisms of locks has progressed only slowly. There have been various impediments, one being the difficulty of forming low friction material in composite members where thick portions must be combined with thin portions and both be made to fit into areas where accepted tolerances are relatively narrow.

It is therefore one of the objects of the invention to provide a new and improved unitary key-actuated mechanism which employs a low friction material as the material for one part which is normally interposed between two other parts, one of which is movable in relation to the other.

Another object of the invention is to provide a new and improved unitary key-actuated mechanism which makes use of three mutually moving parts concentrically enclosed one within another wherein a low friction material is used for the part which is located intermediate of the other two.

Still another object of the invention is to provide a new and improved unitary key-actuated mechanism which makes possible the use of low friction material for one of a plurality of mutually moving concentric parts wherein the part constructed of low friction material must be a composite part, portions of which are relatively thin and other portions of which are relatively thick.

Still another object of the invention is to provide a new and improved unitary key-actuated mechanism which by making use of a low friction material located between mutually moving parts avoids the need for any lubricant and which further provides a device easy to assemble, capable of being constructed with tolerances no greater than normally employed in the art, and which is sufficiently easy to mold or otherwise form that the cost of the assembly can be held to a relative minimum.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a side perspective exploded view of the various parts of the key-actuated mechanism.

FIGURE 2 is a side elevational view, partially broken away, showing the key-actuated mechanism interlocked in an appropriate container.

FIGURE 3 is a rear view, partially broken away, showing the key-actuated mechanism in retained position.

FIGURE 4 is a view similar to FIGURE 3, but showing the key-actuated mechanism in withdrawn position, permitting withdrawal of the key-actuated mechanism from the retainer.

In an embodiment which has been chosen primarily for the purpose of illustrating the invention, there is shown a key-actuated mechanism indicated generally by the reference character 10, many parts of which are, in general, well known in the art, wherein the special feature of the invention is incorporated in order to provide a new relationship of parts. The key-actuated mechanism is shown in a form adapted to be retained in temporary fixed position in a retainer 11.

More particularly, the key-actuated mechanism consists of a substantially tubular cylindrical casing 12, a substantially cylindrical key plug 13, and a somewhat composite cam sleeve 14, all of which are adapted to be concentrically mounted in rotatable relationship, one with respect to the other.

The casing 12 has a cylindrical recess 15, extending from end to end thereof and has one side a longitudinally extending and radially outwardly projecting tumbler housing 16. The tumbler housing 16 has a series of substantially conventional tumbler bores 17 used for the familiar purpose of accommodating conventional pin tumblers. The tumbler housing 16 has a pocket 18 on the inside surface extending over a portion of its length. At the junction of the tumbler housing 16 with the casing 12 there is a lateral opening 19 substantially coincident in length and thickness with pocket 18 and opening to the exterior.

The cam sleeve 14 may be constructed of a synthetic plastic resin material having low friction surface characteristics. The cam sleeve 14 is made up of a cylindrical section 20 having a cylindrical bore 21 extending therethrough from end to end. On one side of the cylindrical section 20 is a longitudinally extending radially projecting tumbler housing 22 which is provided with tumbler bores 23 adapted to coincide with the tumbler bores 17 in the tumbler housing 16 when the parts are in a desired condition of alignment.

Extending radially outwardly from the side 24 of the tumbler housing 22 is an arcuate circumferentially projecting cam element 25. Of special significance is the provision of a longitudinally extending slit 26 which extends throughout the full length of the cylindrical section 20, on one side thereof, preferably on the side remote from the location of the tumbler housing 22 and cam element 25.

The key plug 13 is substantially conventional in its construction and is provided with a keyway 27, holes 28 for reception of a removable tailpiece (not shown), and an annular flange 29 at the opposite end, the flange 29 being adapted to position the key plug 13 in a proper position lengthwise with respect to the other parts of the device. The key plug 13 is also provided with a series of tumbler bores 30 which are adapted to coincide respectively with the tumbler bores 23 in the tumbler housing 22 and tumbler bores 17 in the tumbler housing 16 when in a proper position of alignment.

The key plug 13 is adapted to be located concentrically within the cylindrical bore 21 of the cylindrical section 20, and these two parts in turn are located concentrically within the cylindrical recess 15 of the casing 12. This relationship is shown to good advantage in FIGURES 3 and 4. It is particularly significant that the clearance between the exterior surface of the key plug 13 and the surface of the cylindrical recess 15 is relatively narrow and that this clearance is snugly but rotatively filled by the interposition of the cylindrical section 20.

When in position, edges 31 and 32 of the slit 26, although separate from each other, are brought very close together, approaching each other with a clearance of a small fraction of an inch, namely from five to fifteen thousandths in most constructions. The leeway present, however, is substantial, considering the dimensions of the parts, and is adequate to permit a certain amount of self-adjustment of the cylindrical section 20 when in position and to compensate for slight differences in clearances allowed by the usual machine tolerance of the other parts. It is also important that the spacing between the edges 31 and 32 be kept small enough so that it will not impair to any extent the smooth passage of the ends of tumblers 35 when they are rotated past the location of the slit 26.

Also, when the parts are in the concentric position as described, the tumbler housing 22 will lie within the pocket 18 with ample clearance between sides of the pocket 18 and one side or the other of the tumbler housing 22. The cam element 25, at the same time, will occupy a position in alignment with the opening 19.

In the tumbler bores 17 are located a series of tumblers 36, one of which is shown in FIGURES 3 and 4, the tumblers 36 having a sliding fit in the respective tumbler bores 17. Another set of tumblers illustrated by the tumbler 37 is located in the respective tumbler bores 23 of tumbler housing 22. The tumblers represented by the tumbler 35, as shown by FIGURES 3 and 4, occupy a position in the respective tumbler bores 30 of the key plug 13.

When the respective parts are in the alignment of FIGURE 3, all of the tumbler bores and tumblers are in axial alignment. This is the condition when there is no key inserted in the keyway 27. It will be noted in this position of adjustment that the cam element 25 is extended outwardly through the opening 19. Further, for example, it will be assumed that the key-actuated mechanism 10 has been inserted in a central recess 38 of the retainer 11, at which time sides 39 and 40 of a slot 41 will overlie opposite sides of the key-actuated mechanism 10 at the junction of the casing 12 with the tumbler housing 16. Also, at the same time, the cam element 25 will be extended into an offset 42 of the slot 41. In this position of the cam element 25, a forward edge 43 of the cam element 25 will be located behind and in abutment with a shoulder 44 formed by the outer end of the offset 42. Therefore, in this position, the key-actuated mechanism 10 is interlocked in the retainer 11.

When it is time to remove the key-actuated mechanism 10 from the retainer 11, it is necessary to withdraw the cam element 25 from the position of FIGURE 3 to the position of FIGURE 4. This is accomplished by inserting the special key 45. Insertion of the special key 45 moves the tumblers 37 outwardly so that outer ends 46 of the tumblers 37 coincide with a shear line determined by an outside surface 47 of the tumbler housing 22 and inside surface 48 of the pocket 18. In this position, at least some of the tumblers 35 will be in position such that outer ends 50 do not coincide with a shear line determined by the outside surface of the key plug 13 and the surface of the cylindrical bore 21, so the key plug 13 cannot rotate with respect to the cam sleeve 14 and its cylindrical section 20.

Consequently, for this portion of the operation, the cam element 25 can be rotated counterclockwise as viewed in FIGURES 3 and 4, thereby to withdraw it into the pocket 18 through the opening 19, far enough to remove the cam element 25 from its position behind the shoulder 44. As a consequence, the key-actuated mechanism 10 can be withdrawn from the retainer 11. After inserting a new key-actuated mechanism 10 in position in the retainer 11, by use of the same special key 45, the cam element 25 can be then again extended to project into position in the offset 42. The key-actuated mechanism 10 is in this way temporarily interlocked with the retainer 11.

When the cam sleeve 14 is constructed entirely of synthetic plastic resin material, all outer surfaces of which have a low coefficient of friction, all of the mutual rotating parts can move freely, one with respect to the other without employment of any lubricant. The snug but free moving rotation thus created is built into the assembly and continues to assure effective operation for the life of the parts; the life being extended beyond that of devices constructed entirely of metal because of the highly reduced wear inherent in use of the low friction intermediate surfaces.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a key-actuated mechanism for locks comprising a case having a recess therein, a longitudinally extending and radially outwardly projecting tumbler housing on the side of said case, and a substantially cylindrical key plug having a rotatable mounting in said recess and pin tumblers in said key plug in longitudinal alignment with pin tumblers in said tumbler housing, said tumbler housing having a pocket on the inside surface with a laterally facing opening, the combination of an interlocking cam sleeve including a cylindrical section between the key plug and the case whereby to provide a rotatable spacer therebetween, a longitudinally extending radially projecting tumbler housing on the side of said cylindrical section of the cam sleeve, and a cam element on the exterior of said cylindrical section of the cam sleeve adapted to be extended into said lateral opening, said cylindrical section of the cam sleeve having opposite resilient side portions and a longitudinally extending slit separating said side portions, said slit extending throughout the length thereof opposite edges of said slit being spaced from each other a distance substantially less than the diameter of said pin tumblers in the tumbler housing.

2. In a key-actuated mechanism for locks comprising a case having a recess therein, a longitudinally extending and radially outwardly projecting tumbler housing on the side of said case, and a substantially cylindrical key plug having a rotatable mounting in said recess, said tumbler housing having a pocket on the inside surface with a laterally facing opening therefrom, the exterior of the key plug and the wall of said recess in the case having an annular clearance therebetween, the combination of an interlocking cam sleeve of synthetic plastic resin material comprising a cylindrical section located in and substantially filling the clearance between the key plug and the case with a close, rotating fit, a longitudinally extending radially projecting tumbler housing on the side of said cylindrical section of the cam sleeve, and a circumferentially projecting cam element on the exterior of said cylindrical section of the cam sleeve, said cam element having a rotationally movable mounting in said recess and in said lateral opening therefrom, said cylindrical section of the cam sleeve having opposite resilient side portions and a longitudinally extending slit separating said side portions, said slit having edges separate from each other in close proximity when in assembled position in the case and movable relative to each other during assembly in accordance with the relationship between the inside diameter of said cylindrical section and the outside diameter of said key plug.

3. In a key-actuated mechanism for locks comprising a case having a recess therein, a longitudinally extending and radially outwardly projecting tumbler housing on one side of said case, said housing having radially extending tumbler bores therein, and a substantially cylindrical key plug having a rotatable mounting in said recess, said housing having a pocket on the inside surface with a laterally facing opening at the junction of said case and said housing, the exterior of the key plug and the wall of said recess in the case having a clearance therebetween, the combination of an interlocking cam sleeve of synthetic plastic resin material comprising a cylindrical section located in and substantially filling the clearance between the exterior of the key plug and the wall of said recess in the case throughout the length and circumference thereof with a close rotating fit, a longitudinally extending radially projecting tumbler housing on one side of said cylindrical section of the cam sleeve, and a circumferentially projecting cam element on one side of said cylindrical section of the cam sleeve, said cam element being rotationally movable in said recess and in said lateral opening therefrom, said cylindrical section of the cam sleeve having opposite relatively thin walled resilient side portions and a longitudinally extending slit separating said side portions, said slit extending throughout the length thereof on a side remote from said cam element, said slit having edges separate from each other in close proximity when in assembled position in the case.

References Cited by the Examiner
UNITED STATES PATENTS

| | | | |
|---|---|---|---|
| 1,561,771 | 11/1925 | Best | 70—369 |
| 3,190,091 | 6/1965 | Russell et al. | 70—224 |
| 3,206,958 | 9/1965 | Best | 70—369 X |
| 3,209,568 | 10/1965 | Patriquin | 70—373 |

EDWARD C. ALLEN, *Primary Examiner.*

P. TEITELBAUM, *Assistant Examiner.*